United States Patent [19]
Wang et al.

[11] Patent Number: 5,649,289
[45] Date of Patent: Jul. 15, 1997

[54] FLEXIBLE MOBILITY MANAGEMENT IN A TWO-WAY MESSAGING SYSTEM AND METHOD THEREFOR

[75] Inventors: Zhonghe Wang, Lake Worth; Robert John Schwendeman, Pompano Beach, both of Fla.

[73] Assignee: Motorola, Inc., Schaumburg, Ill.

[21] Appl. No.: 500,280

[22] Filed: Jul. 10, 1995

[51] Int. Cl.$^6$ ................................................. H04Q 7/00
[52] U.S. Cl. ........................... 455/31.3; 455/433; 455/458
[58] Field of Search ........................ 455/33.1, 33.2, 455/33.4, 34.1, 34.2, 53.1, 54.1, 54.2, 56.1, 67.1, 89; 379/57, 59; 340/825.44

[56] References Cited

U.S. PATENT DOCUMENTS

| | | | |
|---|---|---|---|
| 4,876,738 | 10/1989 | Selby | 455/33.1 |
| 5,095,531 | 3/1992 | Ito | 455/33.1 |
| 5,153,902 | 10/1992 | Buhl et al. | 379/57 |
| 5,212,822 | 5/1993 | Fukumine et al. | 379/60 |
| 5,274,845 | 12/1993 | Wang. | |
| 5,276,905 | 1/1994 | Hurst et al. | 455/33.1 |
| 5,305,466 | 4/1994 | Taketsugu | 455/54.1 |
| 5,369,681 | 11/1994 | Boudreau et al. | 455/33.1 |
| 5,408,683 | 4/1995 | Ablay et al. | 455/33.1 |
| 5,450,617 | 9/1995 | Moore | 455/54.2 |
| 5,475,862 | 12/1995 | Sawyer | 455/54.1 |
| 5,517,677 | 5/1996 | Moon | 455/161.1 |

FOREIGN PATENT DOCUMENTS

| | | | |
|---|---|---|---|
| 0131131 | 6/1991 | Japan | 455/33.1 |

*Primary Examiner*—Reinhard J. Eisenzopf
*Assistant Examiner*—Doris To
*Attorney, Agent, or Firm*—Aaron B. Bernstein; D. Andrew Floam

[57] ABSTRACT

A two-way messaging system (100) having a plurality of message subscriber units (500) and a base station (220) in each of a plurality of cells (210). The base station has a transmitter (224) for transmitting messages in an associated cell (210) and a receiver (228) associated therewith for receiving response signals from message subscriber units in a cell. A system controller (300) is coupled to each base station (220) and has a memory (320) for storing the customer paging area data for each message subscriber unit. The system controller (300) receives message requests and automatically updates the customer paging area data for each message subscriber unit (500) by tracking the mobility pattern of each message subscriber unit (500) in the messaging system coverage area (200).

20 Claims, 9 Drawing Sheets

FLEXIBLE MOBILITY MANAGEMENT IN A TWO-WAY MESSAGING SYSTEM AND METHOD THEREFOR

FIELD OF THE INVENTION

The present invention is directed to a two-way messaging system, and more particularly to a method and apparatus for efficiently managing system capacity with minimal system complexity and optimal battery power utilization in a subscriber unit.

BACKGROUND OF THE INVENTION

Paging systems have evolved into more robust communication systems capable of transmitting alphanumeric, voice and image data to portable receivers. Two-way paging systems are on the horizon. In a two-way paging system, the portable device transmits a limited content response signal which includes a reply message or an acknowledgment message in response to receiving a message. Thus, the term "messaging" is a broader term which encompasses the transmission of data messages, voice messages, facsimile messages, etc., as well as contemplating the transmission back from the portable or remote unit of a response signal which is a reply message or an acknowledgment message.

A messaging system comprising a plurality of message subscriber units (capable of receiving messages and transmitted response signals) will accommodate a variety of message types, some which require more "air-time", such as data messages and facsimile messages, than others. The challenge is to optimize the transmission of messages to message subscriber units so as to maintain a high system capacity. Part of this challenge involves transmitting messages only in those portions of a messaging system coverage area where the message subscriber unit is likely to be located.

DETAILED DESCRIPTION OF THE DRAWINGS

Figure 1:
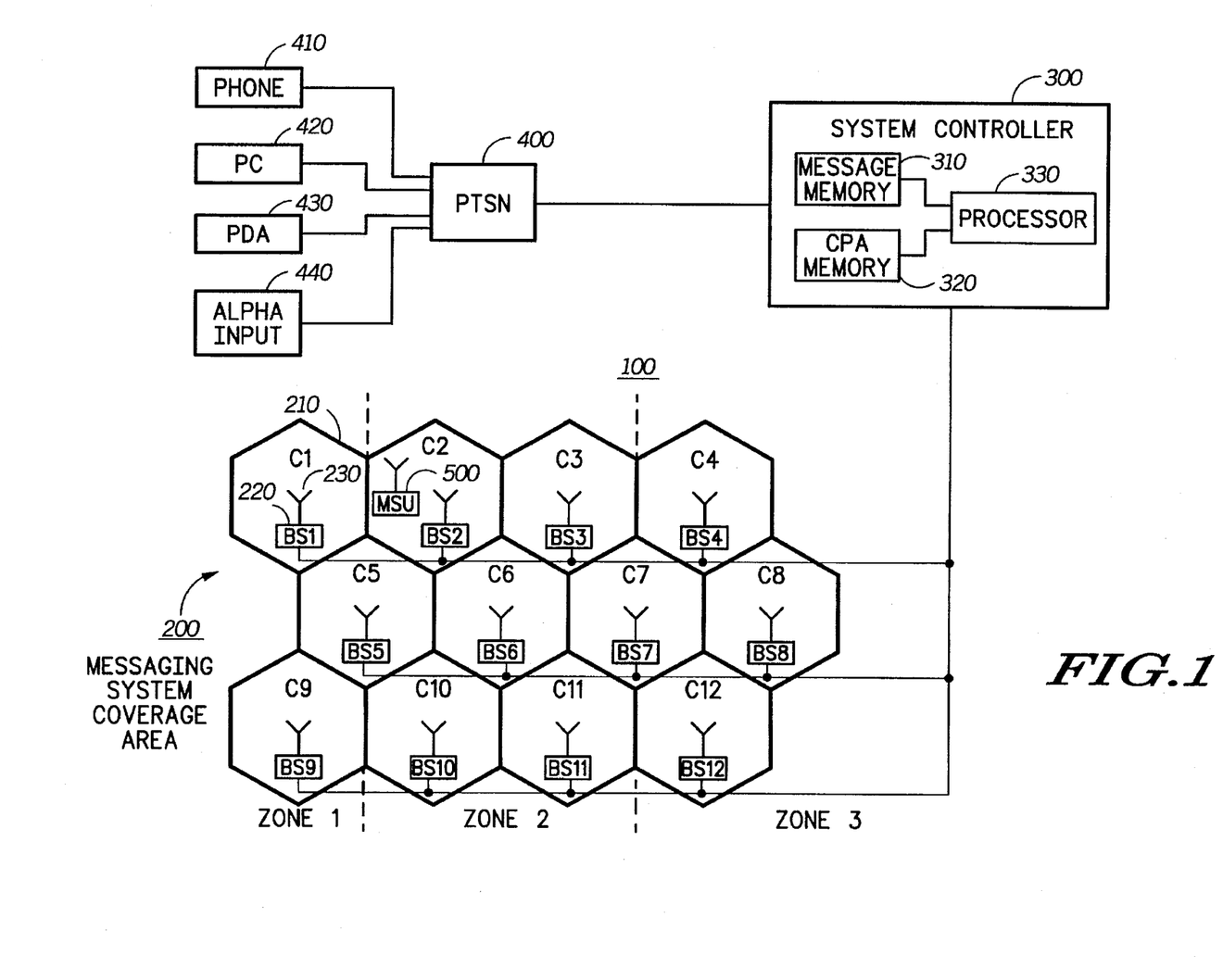
FIG. 1 is an electrical block diagram illustrating the two-way messaging system according to a preferred embodiment of the present invention.

FIG. 1 illustrates a two-way messaging system according to the present invention. The messaging system 100 is designed to provide communication throughout a messaging system coverage area (MSCA) 200. The MSCA 200 comprises a plurality of cells 210, and each cell comprises a base station 220 and at least one antenna 230. FIG. 1 shows that there are 12 cells, numbered C1–C12 each with a base station BS1–BS12; however it should be understood that 12 cells is only an example and that the MSCA 200 can comprise any numbered of cells as is necessary to provide coverage within a messaging system. Moreover, the cells do not necessarily have the geometric configuration shown in FIG. 1. Multiple cells are grouped into a zone such that zone 1 comprises cells C1, C5 and C9, zone 2 comprises cells C2, C3, C6, C7, C10 and C11, and zone 3 comprises cells C4, C8 and C12.

A system controller 300 is coupled to each base station 220 and oversees control of communication throughout the MSCA 200. The system controller 300 comprises a message memory 310, a customer paging area (CPA) memory 320 and a processor 330. Message requests are received by the system controller 300 through the public telephone system network (PTSN) 400 and are stored in the message memory 310 for processing. The CPA memory is for storing customer paging area data as well as for storing location registration information concerning each subscriber unit in the system, which is explained in greater detail hereinafter. Messages are also passed to the system controller 300 through electronic-mail networks including the Internet.

Depending on the size of a MSCA and the number of cells therein, there are more than one system controller for the MSCA, each being dedicated to a particular subset of cells.

Message requests can originate from one of many types of sources, of which FIG. 1 illustrates a few as examples. Numeric and voice messages can originate from a conventional handset phone 410 (wired or wireless). Alphanumeric and voice messages can originate from a personal computer (PC) 420 via a modem. Alphanumeric messages can also originate from a personal data assistant (PDA) 430, via a modem, and from a dedicated alphanumeric input device 440.

A message is transmitted to a message subscriber unit (MSU) 500, only one of which is illustrated in FIG. 1 for simplicity. Each MSU 500 receives messages and in response thereto, transmits a response signal which is received by the system controller 300. Furthermore, the MSU 500 is a portable device, the size of a conventional pager, or smaller, and is carried by users throughout the MSCA 200. Thus, a MSU 500 is subscribed and entitled to receive messages in any cell of the MSCA 200. Due to the mobility of the MSU 500, it is desirable, and a main thrust of the present invention is, to track the movement pattern of the MSU 500 so as to transmit a message in a cell where the MSU 500 is most likely located. The movement pattern is tracked and determined by monitoring in which cells the MSU 500 receives most messages, as will be explained in further detail hereinafter.

Figure 2:
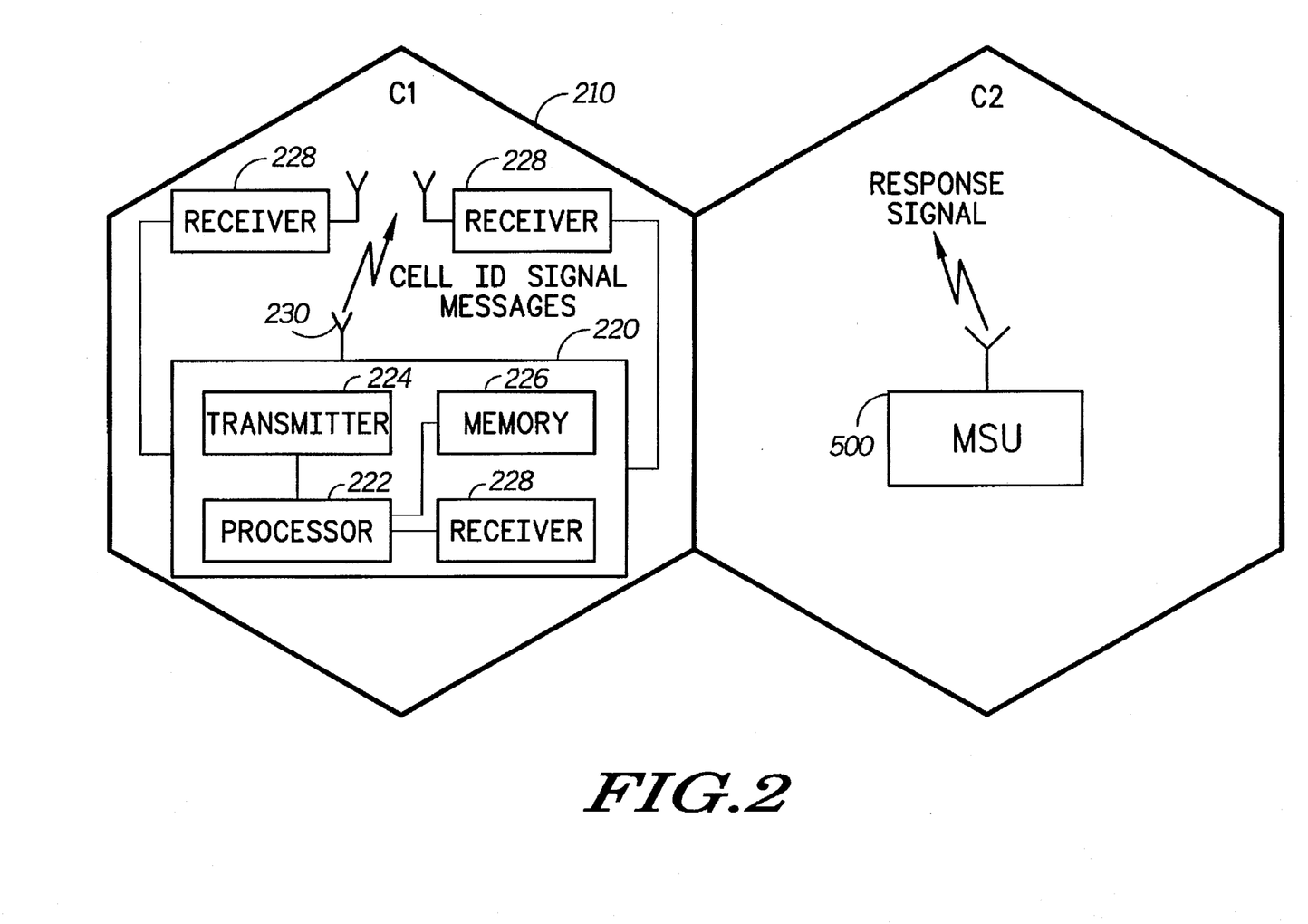
FIG. 2 is an electrical block diagram illustrating a base station and a message subscriber unit, and communication there between according to the present invention.

Turning now to FIG. 2, a base station 220 is shown in greater detail. The base station 220 comprises a processor 222, a transmitter 224, a memory 226 and a receiver 228. The receiver 228 is co-located with the transmitter 224 or optionally is located in another region of the cell. In addition, there are optionally several receivers 228 associated with one base station, each arranged to cover a certain area of a cell. A receiver 228 not co-located with the base station 220 is optionally directly connected to the system controller 300. A cell with multiple receivers 228 is useful because the transmitter in the MSU 500 is a relatively low power transmitter (thus minimizing the power requirements of the MSU 500). While a detailed illustration of the base station 220 is shown only in cell C1 in FIG. 2, it should be understood that cell C2 has a similar base station architecture, which would interact with the MSU 500 shown in cell C2.

Message requests which are received by the system controller 300 are coupled to the base station 220 and stored in the memory 226 for processing by the processor 222. The transmitter 224 of the base station 220 periodically transmits a cell identifier (ID) signal which is received by an MSU so that the MSU can determine where it is located in the MSCA. The transmitter 224 of the base station 220 also transmits messages in the cell for reception by MSU's in the cell. The messages contain address information, as is known in the field of paging, so that the message is received and decoded only by MSU's having a stored message subscriber unit address that matches the address transmitted with the message (individually addressed messages or group address messages). The MSU 500 transmits a response signal to the base station in response to receiving a message which is received by the transmitter 224.

The response signal takes on one of many types. When the MSU 500 receives a message and the signal carrying the message is of adequate quality, the response signal is a positive acknowledgment or ACK. When the MSU 500 receives a message and the signal carrying the message is of poor quality, making accurate message decoding unlikely, then the response signal is a negative acknowledgment called NACK. Other types of response signals include responses to questions posed in messages, such as YES, NO, and other numeric, alphanumeric, graphical or short voice responses. Still another type of response signal is a registration signal which is generated in response to receiving a cell identification signal, described in more detail hereinafter.

The base station transmitter 224 transmits radio frequency signals modulated with the information noted above, and receives radio frequency response signals transmitted by MSU's 500, such as those types of response signals described above. Messages destined for a particular MSU are associated with an address which matches an address stored in the particular MSU. Thus, the MSU decodes a received radio frequency signal, detects whether its address is carried by the radio frequency signal, and decodes a message associated with the address if there is a match. Addressed messages are known by the those with ordinary skill in the art of paging technology.

Figure 3:
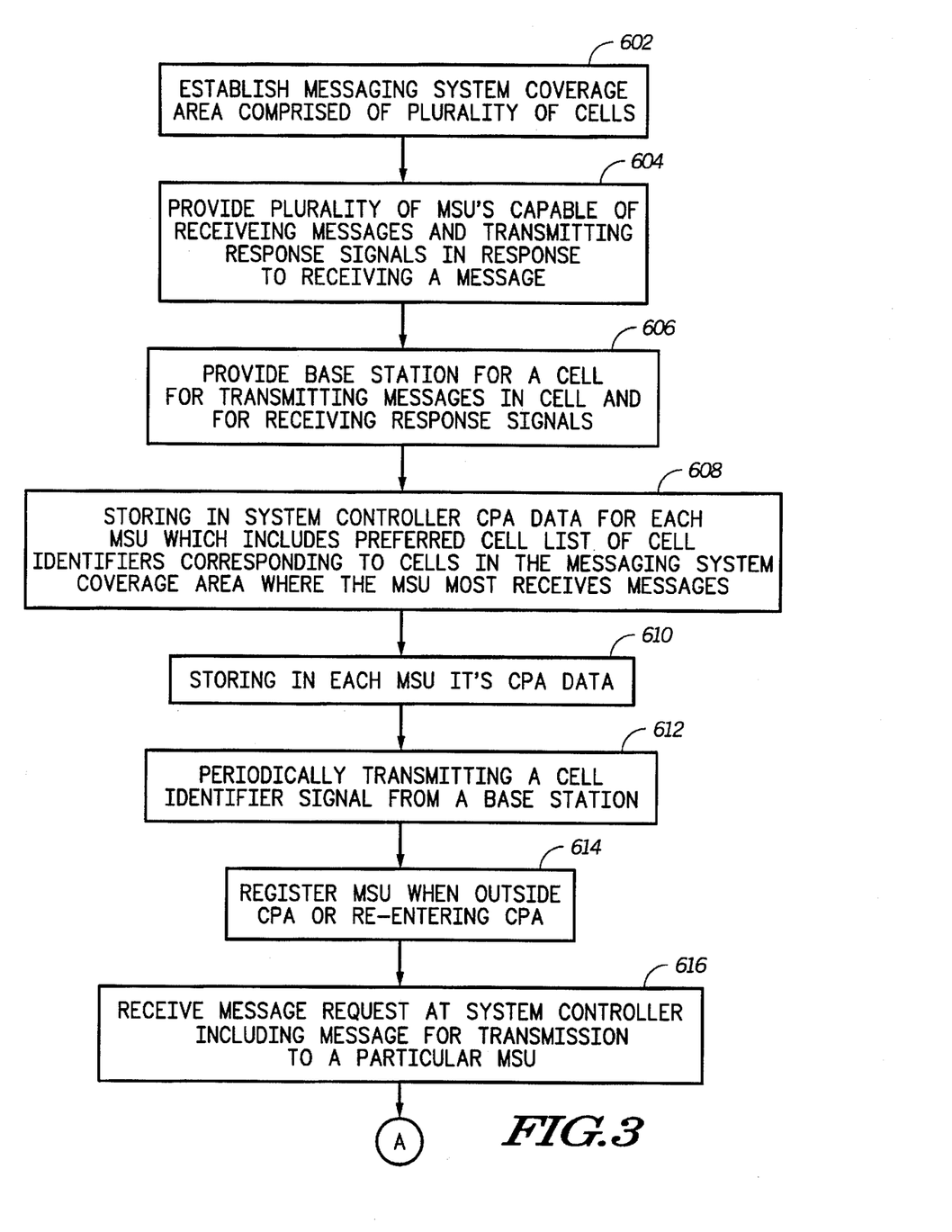
FIGS. 3 and 4 are flow charts which generally illustrate the method of managing communication of a two-way messaging system according to the preferred embodiment of the present invention.
Figure 4:
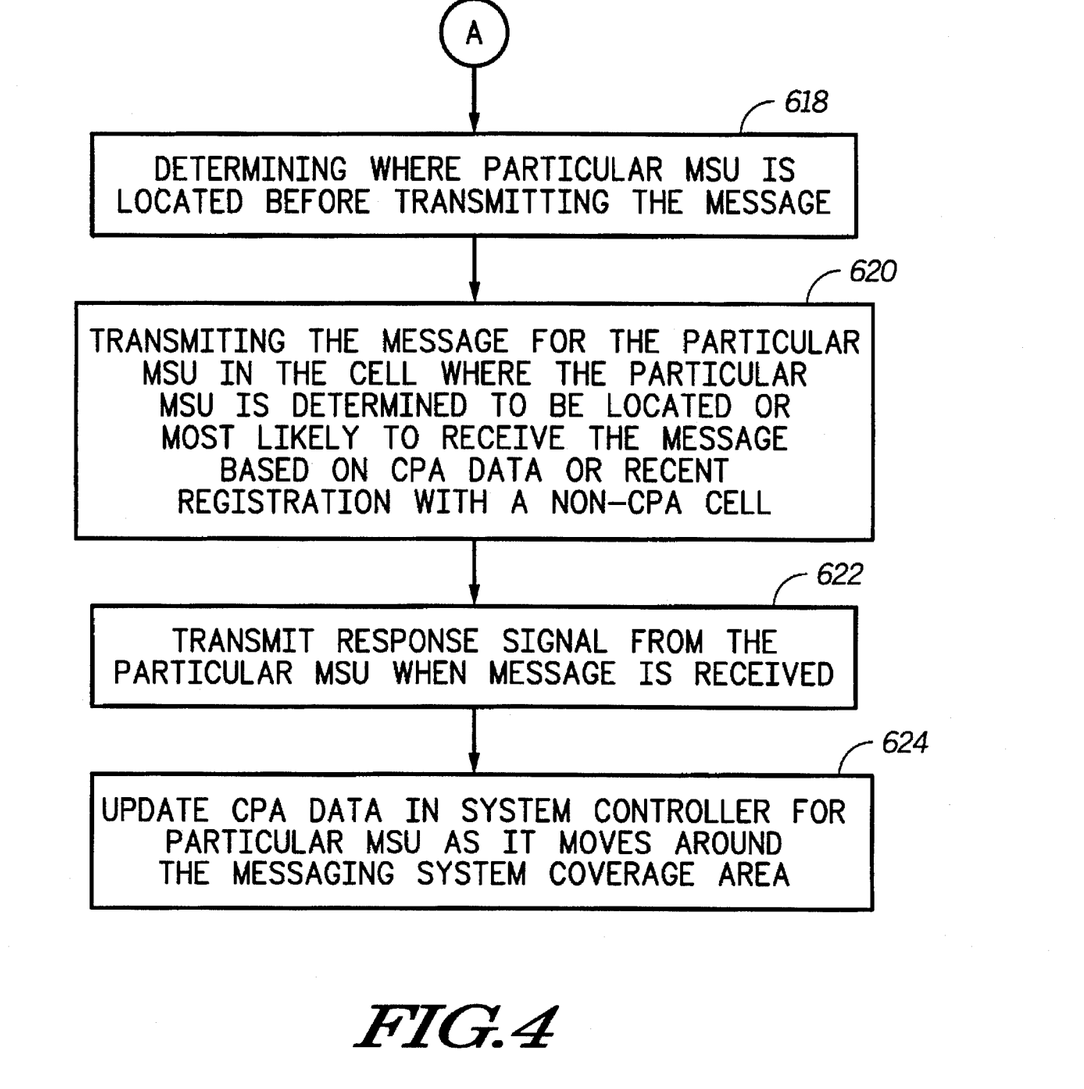

With reference to FIGS. 3 and 4, a general description of the process for managing communication in a two-way message system is provided. The flow charts and description refer to a "particular" message subscriber unit as an example of when a message request is received for transmission to one of the multiple message subscriber units in the system. It will be apparent that certain steps in FIGS. 3 and 4 are being executed in parallel with other steps. Therefore, FIGS. 3 and 4 do not strictly represent a simple sequence of events.

Step 602 represents the establishment of a messaging system coverage area comprised of a plurality of cells. The message system coverage area is for example, the entire United States, or a particular region of multiple states, a single state, a single metropolitan area, etc. Moreover, a single cell shown in FIGS. 1 and 2 is optionally a collection of cells that defines a particular sub-coverage area within the overall messaging system coverage area. The single cell is used as an example for purposes of simplifying this description.

Step 604 represents the provision of a plurality of MUS's each being capable of receiving messages and transmitting response signals in response to receiving messages. The response signal takes on one of the types described above.

In step 606, a base station is provided in a cell for transmitting messages in each cell and for receiving response signals in each cell. As will become apparent in conjunction with step 612, each base station also periodically transmits a cell identifier signal.

In step 608, a system controller is provided to oversee communication in the MSCA. CPA data for each MSU is stored in the memory of the system controller. The CPA data comprises a preferred cell list made up of cell identifiers corresponding to predetermined ones of cells in the messaging system coverage area where the corresponding MSU most often receives messages. These "preferred" cells are initially assigned by the service provider of the messaging system and the user of the particular MSU when service is set up. For example, an initial assignment is the cell where the user's office is located and the cell where the user's home is located. The cell identifiers for these two cells make up the initial entries of the preferred cell list for that user's CPA data.

Additionally, in step 610, at the time of service set-up, the service provider stores the CPA data for that user into the MSU for that user. This is done by known programming devices and methods.

Thereafter, the CPA data in the system controller and in the MSU will be automatically updated/changed according to the mobility habits of the user. The remaining steps in FIGS. 3 and 4 explain how this is accomplished.

Step 612 represents that the base station periodically transmits a cell identifier signal in the corresponding cell. This signal is modulated on a frequency or frequencies to which the MUS's in the messaging system are tuned or are tunable, in order to enable a MSU to detect its location in the MSCA.

When an MSU receives a cell identifier signal, it is compared with the cell identifiers in the CPA data stored on-board. When the cell identifier in the received cell identifier signal is not in the preferred cell list stored in the MSU, the MSU is outside of its CPA and transmits a registration signal as depicted in step 614. The registration signal is received by the receiver(s) associated with the base station in that cell where the MSU is located, and the base station relays this information to the system controller, so as to register the location of the MSU based on which base station receiver best received (greatest signal strength) the registration signal from the MSU. Also, when the MSU re-enters the CPA from a cell outside of the CPA, the MSU transmits a registration signal.

Step 616 represents reception of a message request, from the phone 410, PC 420, PDA 430 or alphanumeric input device 440, for example, by the system controller 300. The message request includes a message for a particular one of the MUS's in the messaging system.

In step 618, the system controller determines the location of the particular MSU before transmitting the message. The location of the particular MSU is readily determined if a recent registration signal has been received by a base station in the messaging system. Otherwise, the system controller refers to the CPA data stored for the particular MSU. The process of determining the location of the particular MSU is described in greater detail hereinafter in conjunction with FIG. 10.

In step 620, the message for the particular MSU is transmitted in the cell where the particular MSU is determined, in step 618, to be located.

When the particular MSU receives the message, it transmits an appropriate response signal, as indicated by step 622. In step 624, the response signal is received at by a receiver 228 and relayed to the system controller 300 so that the system controller 300 can update the CPA data for the particular MSU as it moves around the MSCA. When the MSU does not receive the message that is transmitted in a cell, no response signal is received and a new cell in the CPA is chosen by the system controller for transmission of the message, until all cells in the CPA are tried, and failure is ultimately declared.

Figure 5:
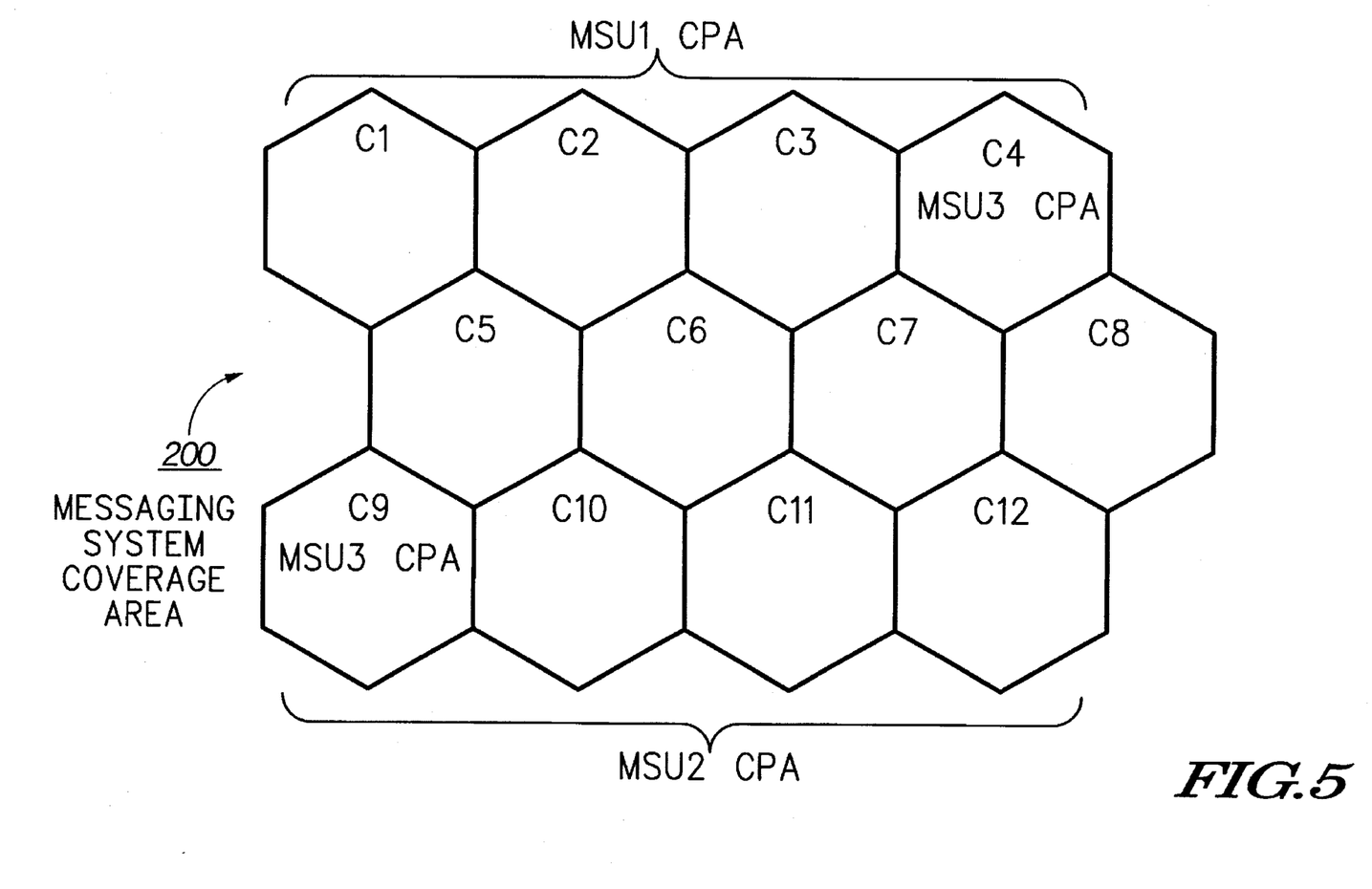
FIG. 5 is a diagram showing a messaging system coverage area and the dynamically changing customer paging areas associated with message subscriber units in the two-way messaging system according to the preferred embodiment of the present invention.

Referring to FIG. 5, the CPA data will be described. The CPA data comprises a preferred cell list for each MSU. The preferred cell list is a list of cells where the MSU is located the most, based on acknowledgment of transmitted messages or registration with a cell. As mentioned above, the CPA data is initially established at service set-up to be those cells where the user anticipates being located the most. However, after set-up and during use of the MSU, the mobility habits of the MSU are tracked and the CPA data updated.

FIG. 5 is a "snapshot" at a particular instant of time of the CPA data for MSU1, MSU2 and MSU3. For MSU1, the CPA consists of cells C1, C2, C3 and C4; for MSU2, the CPA consists of cells C9, C10, C11 and C12; and for MSU3, its CPA consists of cell C4 and C9.

In order to establish when a cell is considered to be part of a preferred cell list or CPA for an MSU, a usage index (UI) is established as a measure of usage of a cell for each MSU. Thus, the UI is a measure of probability that an MSU will receive a message. For example, the UI consists of the number of messages received by the MSU in that cell or the occurrence of a registration signal being transmitted by the MSU for that cell, which are collectively referred to as message receiving events. A cell is assigned to the preferred cell list for an MSU when the number of messages received by the MSU in that cell and the number of registration signals for that cell exceeds a predetermined threshold, called Th1. The UI is normalized once the total number of received messages for an MSU exceeds a predetermined maximum. The preferred cell list is a list of cells with UI>Th1 and is arranged in descending order of UI's such that the first cell in the list is the one with the greatest UI that is greater than Th1.

A cell is removed from the cell list when, after normalization, the UI is less than a predetermined minimum called Th2. Thus, when UI was before normalization greater than Th1, but after normalization less than Th2, that cell is removed from the preferred cell list.

The thresholds Th1 and Th2 are optionally different for individual MUS's. However, generally Th1 is greater than or equal to Th2.

Figure 6:
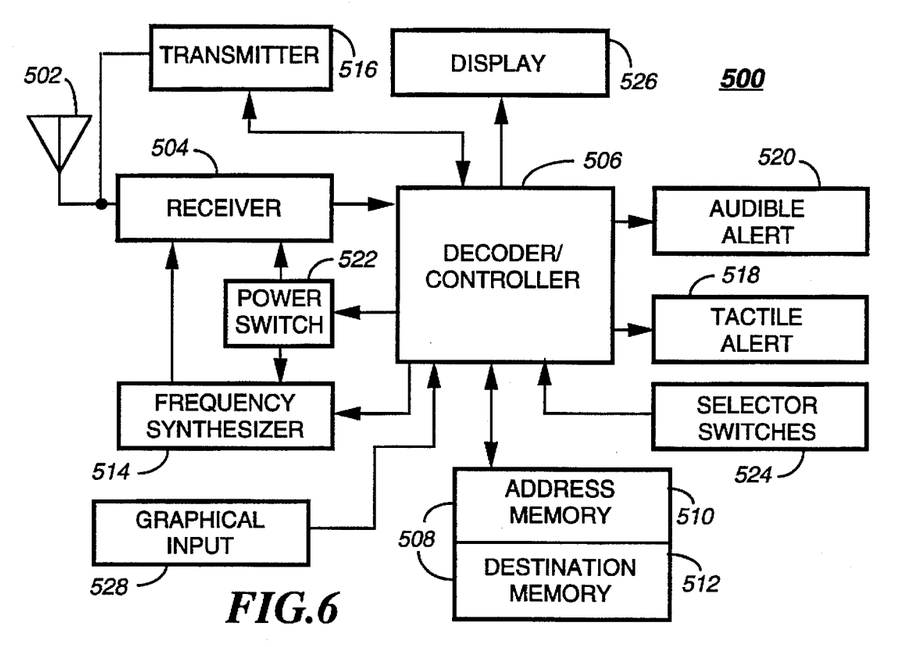
FIG. 6 is an electrical block diagram of a message subscriber unit according to the preferred embodiment of the present invention.

Referring to FIG. 6, a MSU 500 is shown in greater detail. The MSU 500 comprises an antenna 502, a receiver 504, a decoder/controller 506, and a code plug memory 508 including an address memory 510 and a destination memory 512. A frequency synthesizer 514, which is optional, is coupled to the receiver 504 to adjust the tuning frequency of the receiver 504, under control of the decoder/controller 506. The code plug memory 508 is programmable by a remote programming device, as is well known in the art.

A transmitter 516 is coupled to the decoder/controller 506 and the antenna 502 (or a different transmitter dedicated antenna not shown) to transmit an acknowledgment signal when a message is received. In addition, various alert devices are provided, such as the tactile alert 518 and the audible alert 520. A power switch 522 is also provided to activate and de-activate certain components of the MSU 500 under control of the decoder/controller 506.

User input into the selective call receiver is by way of selector switches 524 or graphical input device 528, both of which also interact with the decoder/controller 506 to generate certain response signals. Examples of graphical input device 528 are a touch screen input device, keyboard, virtual keyboard on touch screen input device, etc. Messages which are received by the MSU 500 are displayed on the display 526.

Figure 7:
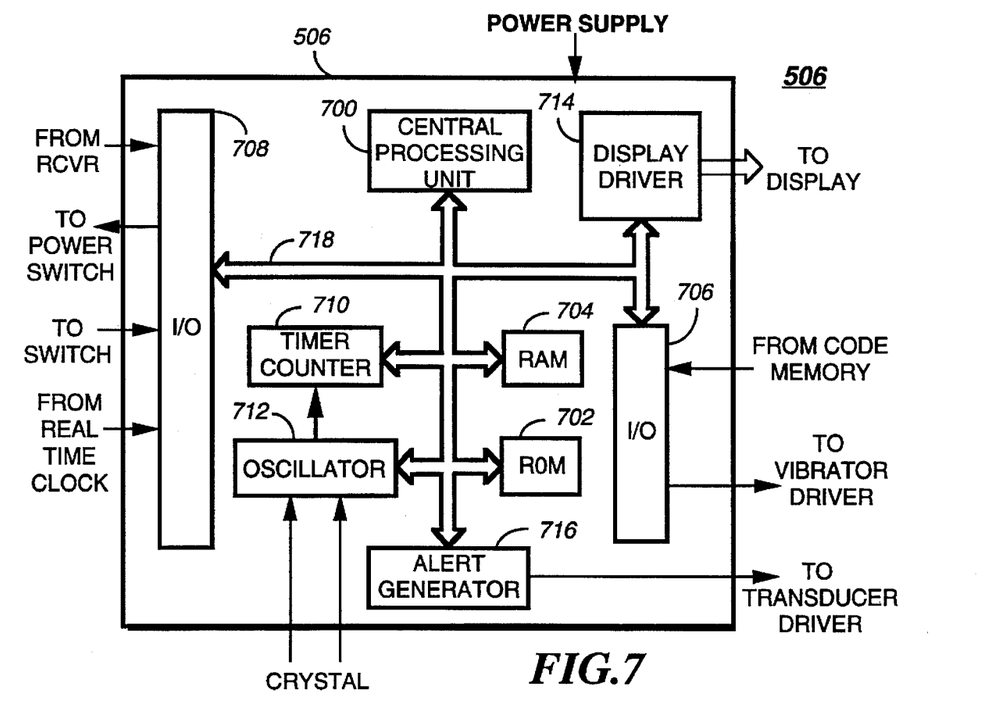
FIG. 7 is an electrical block diagram of a decoder/controller of a message subscriber unit according to the preferred embodiment of the present invention.

FIG. 7 illustrates the decoder/controller 506 in greater detail. At its heart, the decoder/controller 506 comprises a central processing unit 700 which processes software instructions stored in a ROM 702 and/or RAM 704. Data flow into and out of the decoder/controller 506 is controlled by input/output (I/O) ports 706 and 708. A timer counter 710 is connected to the oscillator 712 for certain timing functions. The central processing unit drives the display 526 via a display driver 714. An alert generator 716 generates triggering signals for the alert devices, such as the audible alert 520 and tactile alert 518 shown in FIG. 6. The various components of the central processing unit 700 communicate over the bus 718.

Firmware for executing processing received messages, evaluating quality of received signals and generating response signals (along with other functions) is stored in the ROM 702 or RAM 704 and executed by the central processing unit 700. The CPA data for the MSU is initially stored in the RAM 704, for example, of the MSU 500, and then updates to the CPA data are made on the basis of signals received by the receiver 504 and processed by the decoder/controller 506.

Turning now to the flow charts of FIGS. 8–12, the details of how CPA data of an MSU is updated will be described. FIGS. 8, 10, 11 and 12 are procedures performed in the system controller 300 and FIGS. 9 and 13 are procedures performed in the MSU.

Figure 8:
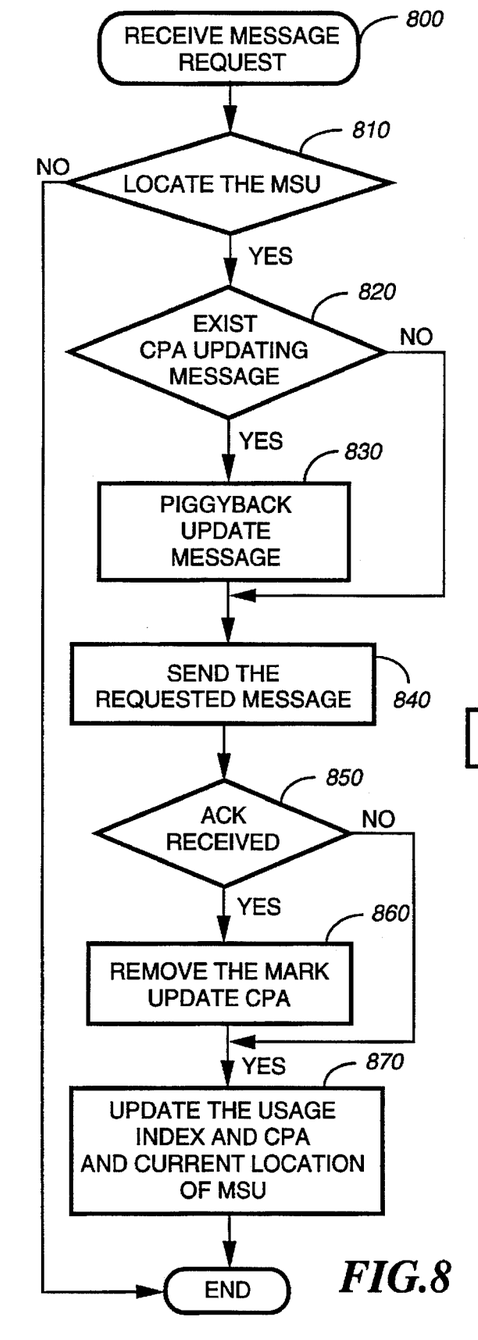
FIG. 8 is a flow chart which illustrates a procedure for receiving a message request and transmitting a message to a message subscriber unit according to the preferred embodiment of the present invention.
Figure 9:
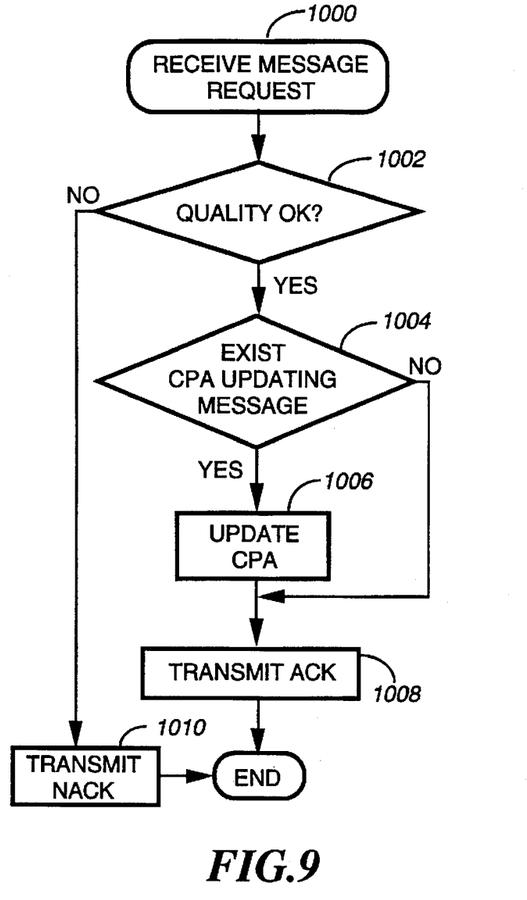
FIG. 9 is a flow chart which illustrates a procedure by which a message subscriber unit receives and acknowledges a message according to the preferred embodiment of the present invention.
Figure 10:
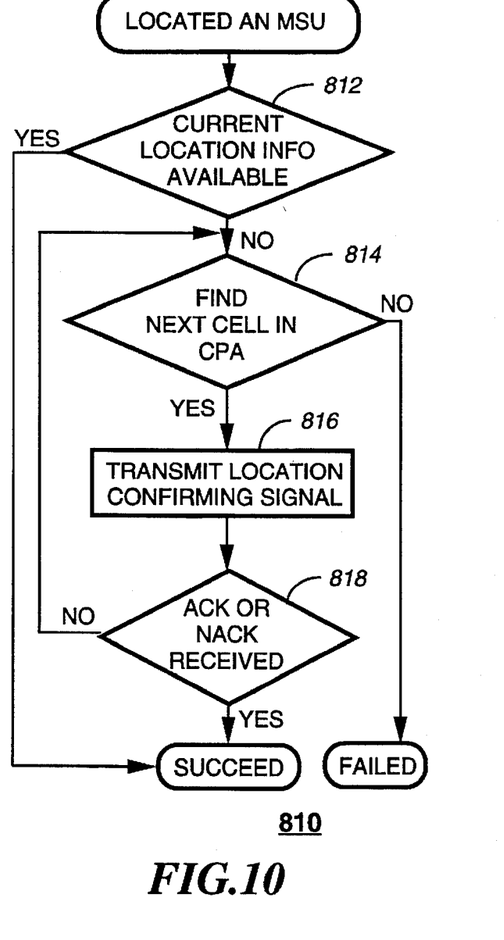
FIG. 10 is a flow chart which illustrates a procedure for determining a location of a message subscriber unit according to the preferred embodiment of the present invention.

FIG. 8 illustrates the main operating procedure in the system controller 300. Initially, in step 800, a message request for an MSU is received by the system controller 300. The system controller in step 810 locates the MSU. The procedure for located the MSU is shown in FIG. 10, which is described hereinafter.

When a location of the MSU is determined from step 810, it is determined in step 820 whether a CPA updating message is due to be transmitted to the MSU. If not, then the procedure jumps to step 840. When there is a CPA updating message to be transmitted, then in step 830, the CPA updating message is transmitted with or "piggybacked" the requested message that was received by the system controller 300 for transmission to the MSU. In step 840, the message is coupled to the base station where the MSU is determined to be located, with or without the CPA updating message as the case may be, for transmission to the MSU.

Next, in step 850, the system controller waits to receive a response signal, specifically a positive acknowledgment signal ACK from the MSU, via the receiver associated with the base station that receives the ACK. If an ACK is not received, then the procedure jumps to step 870. Otherwise, if an ACK is received, then in step 860, a mark (M1 or M2) associated with a cell is removed, if one exists, and the cell associated with the mark is added or deleted from the CPA for that MSU in the system controller 300. The marks M1 and M2 are used to confirm updating the CPA data in the system controller, and will be described in further detail hereinafter.

In step 870, the usage index and CPA data for the MSU are updated in the system controller 300. In addition, the current location of the MSU, as determined in step 810, is also updated in step 870.

Turning to FIG. 10, the procedure for locating an MSU will be described. In step 812, the system controller 300 determines whether it has current location information available regarding reception of a registration signal which indicates that the MSU left its CPA and thus has transmitted a registration signal to the system. A registration signal received from an MSU which just re-entered its CPA is not used as current location information in step 812 because the MSU may have moved to a new cell in the CPA which is different from the cell where the MSU initially re-entered its CPA. When the system controller receives a registration signal for a cell outside its CPA, it registers the MSU for service in that cell outside the CPA and stores this cell as a current location for the MSU, should a message request be received for transmitting a message to that MSU. If the system controller 300 has such information available for the MSU, then that cell from which the registration signal was received is selected for transmission of a message (FIG. 8).

Otherwise, in step 814, when no current location information on the MSU is available, in the system controller 300 searches its CPA memory in order to select a cell in the preferred cell list of the CPA for the MSU. The cell with the highest priority of usage, is chosen first. The cell with the highest priority in the CPA is the one with the highest usage index (described hereinafter) or alternatively is the cell where the last message was received by the MSU or the cell where the MSU re-entered its CPA and transmitted a registration signal.

In step 816, the system controller 300 causes a location confirming signal which is addressed to the MSU (a "where are you" signal) to be transmitted by the base station in the cell of highest priority in the preferred cell list for the MSU. If the MSU acknowledges receipt of this signal with either an ACK or NACK in step 818, the location of the MSU is confirmed to be in that particular cell. Otherwise, the cell in the preferred cell list with the next highest priority is chosen for transmission of the location confirming signal, and the process repeats at steps 814–818 through all cells in the CPA of the MSU until the MSU responds with a response signal (ACK or NACK), or does not respond at all after exhausting the cells listed in the preferred cell list, in which case the location procedure fails.

In steps 814 and 816, it is envisioned that a location confirming signal is transmitted cell-by-cell in descending order of priority in the preferred cell list in anticipation of a response signal from the MSU in each cell, or that a location confirming signal is transmitted independently in all of the cells (or geographically separated cells considering effects of interference between cells) of the CPA for the MSU without waiting for reception of a response signal from each cell.

Thus, registration of a particular MSU involves transmitting a registration signal from the particular message subscriber unit when the particular message subscriber unit leaves its customer paging area as determined in response to receiving a cell identifier signal having a cell identifier corresponding to a cell which is not in its customer paging area. This occurs, however, only when a previously received cell identifier signal had a cell identifier corresponding to a cell inside the customer paging area of the particular message subscriber unit, or when the particular message subscriber unit is outside its customer paging area and determines that it is in a new cell in response to receiving a cell identifier signal having a cell identifier different from a cell identifier in a previously received cell identifier signal. The registration signal is received in the cell outside the customer paging area of the particular message subscriber unit and is relayed to the system controller for registering and storing a location for the particular message subscriber unit.

In sum, there are levels of priority according to which a cell is chosen for transmission of a message. The highest priority level is when there is current location information for an MSU which has left its CPA, in which case a registration signal was transmitted by the MSU and stored with the system controller to identify that cell outside the CPA. The next highest priority level is when no registration information is found in the system controller and the CPA data is used. The first cell chosen in the CPA is either the one with the highest usage index, or alternatively is the one where the MSU most recently received a message or the cell where the MSU just re-entered its CPA. Thereafter, cells with lower priorities in the CPA are used until exhausted and no reply to the location confirming signal is made.

Figure 11:
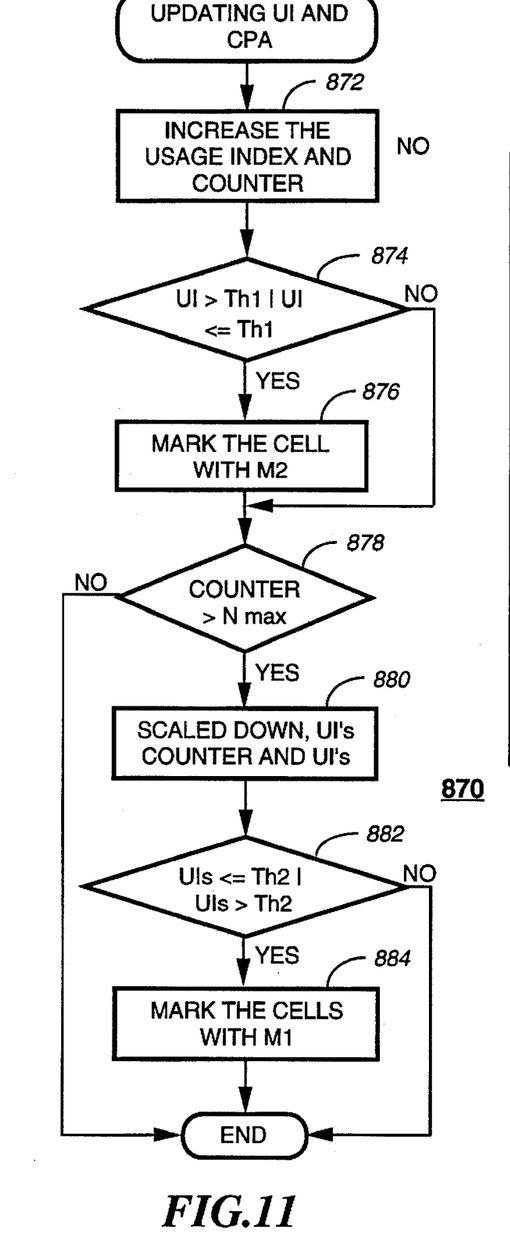
FIG. 11 is a flow chart which illustrates a procedure for updating customer paging area data according to the preferred embodiment of the present invention.

The procedure for updating the usage index and CPA data in the system controller is shown in FIG. 11. In step 872, if the message transmitted in step 840 is acknowledged in step 850 or a registration signal is received for an MSU, the UI for the cell in which the message was transmitted and acknowledged, or the registration signal received, is incremented. Thus, the usage index represents a number of message receiving events by a message subscriber unit in each cell. In addition, a occurrence counter is incremented. Next, in step 874, it is determined whether the UI for that cell is greater than a first predetermined threshold Th1 under the condition that at the last iteration or update the UI for that cell was less than or equal to the first predetermined threshold Th1. When it is determined in step 874 that the UI for a cell exceeds the first predetermined threshold Th1 when at the last update it was not, then cell is marked with an addition mark M2. The addition mark M2 indicates that the system controller is planning to add the cell to the CPA for that MSU, but will wait until the MSU has confirmed reception of a CPA update message which instructs the MSU to add that cell to its CPA. Thus, the CPA data in the system controller and the MSU will match because the system controller updates its CPA data for the MSU only when it receives acknowledgment that the MSU received the CPA updated message. In step 878, when the counter exceeds a predetermined maximum number of total message receiving events (including acknowledged messages and registration signals) Nmax, then in step 880, the UI's are normalized or scaled down appropriately and the counter is reset. In step 882, after the normalization of step 880, the UI for each cell is compared with a second predetermined threshold Th2 to determine if it is less than or equal to the second predetermined threshold Th2, when before normalization, UI for the cell was greater than the second predetermined threshold Th2. If the UI for the cell is less than the threshold Th2 when before normalization the UI was greater than the threshold Th2, the cell is marked with a deletion mark M1. The deletion mark M1 indicates that the system controller is planning to delete the cell from the CPA for that MSU, but that the MSU has not yet confirmed reception of a CPA update message which instructs the MSU to delete the cell from its CPA.

Referring back to FIG. 8, the system controller removes the mark M1 or M2 associated with a cell when the system controller receives an ACK signal, indicating that the MSU receives the requested message and the CPA update message. The cell is then either added or deleted from the CPA accordingly in the system controller 300.

Thus, the CPA update procedure of FIG. 11 has a hysteresis characteristic in that a cell, once added to the CPA, is not immediately deleted from the CPA once its UI drops significantly. Rather, it is a very adaptive and gradual process. The value of Nmax is chosen to not be too big so as to be too slow in responding to changes. Its value is optionally different for light users versus heavy users in the system. The first predetermined threshold Th1 and the second predetermined threshold Th2 are chosen to provide a stable tracking of the CPA data without substantial oscillation.

Figure 12:
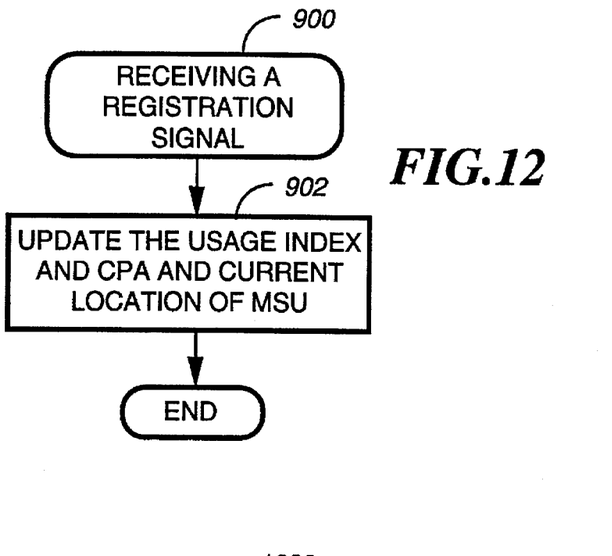
FIG. 12 is a flow chart illustrating a procedure in message subscriber unit for registering a location which leaves its customer paging area according to the preferred embodiment of the present invention.
Figure 13:
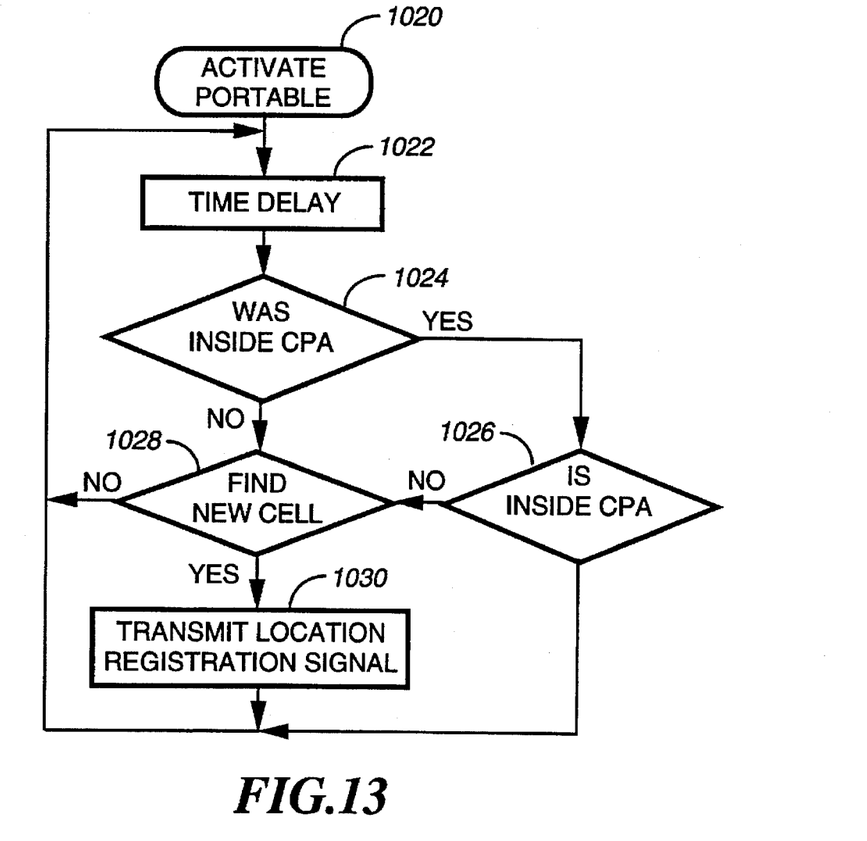
FIG. 13 is a flow chart illustrating a procedure for processing a registration signal from a message subscriber unit which leaves its customer paging area according to the preferred embodiment of the present invention.

FIG. 12 illustrates how the system controller processes reception of a registration signal from an MSU. In step 900, the system controller receives the registration signal relayed to it by the cell-located receiver that received it. In step 902, the CPA and UI are updated by the same procedure shown in FIG. 11 when a registration signal is received. In addition, in step 902, the system controller 300 stores a current location of the MSU based on in which cell the MSU most recently received a message and acknowledged reception of the message. This is useful in determining which cell in the CPA is first chosen for transmission of a location confirming signal for the next message request, explained above in conjunction with step 814 in FIG. 10.

Referring to FIGS. 9 and 13, the procedures by which an MSU processes CPA updating information and other signals is described. In FIG. 9, the MSU receives a message in step 1000. The message referred to in step 1000 is a data message, voice message, or graphics message, etc., which is created by a party via the input devices 410–440, for example, shown in FIG. 1. In step 1002, the MSU determines whether the quality of the received message is satisfactory and reliable. When the message received is not of satisfactory or reliable quality, then a NACK response signal is transmitted by the MSU in step 1010. This may be followed up by a repeat transmission of the message to the MSU by the system controller 300.

When the quality of the received message is sufficient, then in step 1004, it is determined whether a CPA update message is attached to the message. When a CPA update message exists with the received message, the CPA data stored in the MSU is updated in step 1006 accordingly. For example, the CPA update message informs the MSU to add a particular cell, such as cell C5, to the preferred cell list. When no CPA updating message accompanies the message, step 1006 is bypassed and an ACK signal is transmitted by the MSU in step 1008.

In FIG. 13, step 1020 the MSU is periodically determines its location in the MSCA by comparing a received cell identifier signal with its stored CPA. When a predetermined period of time expires in step 1022, the MSU determines in step 1024 whether it was in a cell that is within its CPA at the previous determination. If it was within its CPA at the previous activation period, then in step 1026, the MSU determines whether it is currently within its CPA. If the MSU determines that it is still in its CPA in step 1026, then there is no need to transmit a registration signal and the MSU can return to its normal listening mode during which it detects its address in a transmitted signal in a cell.

When the MSU determines in step 1024 that it was outside its CPA at the previous determination or was inside its CPA at the previous determination, but at the present determination is no longer inside the CPA (step 1026), then in step 1028, it determines whether the cell identifier signal transmitted in the cell corresponds to a new cell (different from the cell outside the CPA at the previous determination) which is also outside its CPA or whether it is in a cell which is inside its CPA. In step 1028, when the cell identifier signal received by the MSU corresponds to a cell outside the CPA different from the non-CPA at the previous determination, then the MSU transmits a location registration signal in step 1030. On the other hand, when the MSU has not moved to a different non-CPA cell, then a location registration signal is not transmitted because there is no new location information to report. Furthermore, when the cell identifier signal received by the MSU corresponds to a cell inside the CPA, then this indicates that the MSU has moved back into its CPA and in step 1030 the MSU transmits a location registration signal. Thus, whenever the MSU moves out of its CPA it transmits a registration signal, and whenever the MSU moves to a different cell outside its CPA, it transmits a registration signal.

The location registration signal transmitted in step 1030 is, for example, a signal which identifies the MSU which transmits it and also identifies (by address) the cell from which it is transmitted. Thus, the system controller 300, by receiving a registration signal, knows which MSU transmitted it, and from which cell the signal was transmitted.

The procedures of FIGS. 9 and 13 are implemented, for example, by firmware stored in the ROM 702 or software stored in the RAM 704 of the MSU.

A particular advantage of the present invention is that the majority of the "intelligence" for locating an MSU and tracking the mobility pattern of the MSU in the MSCA, is in the system controller. The MSU merely stores the preferred cell list, which is updated by the system controller with the next transmission of a message to the MSU. Furthermore, updating of the CPA data in the MSU is achieved with minimal additional "air time" because the CPA update message is transmitted with the next message to be sent to the MSU.

The above description is intended by way of example only and is not intended to limit the present invention in any way except as set forth in the following claims.

What is claimed is:

1. A method for managing communication of messages to message subscriber units in a two-way messaging system comprising steps of:

providing a plurality of message subscriber units which are subscribed to receive messages in a messaging system coverage area, each of said message subscriber units receiving a message and transmitting a response signal upon reception of a message;

storing in a system controller, customer paging area data for each message subscriber unit, said customer paging area data for each message subscriber unit comprising a preferred cell list of cell identifiers which define a customer paging area for each message subscriber unit that comprises predetermined ones of a plurality of cells in a messaging system coverage area where a message subscriber unit is most receiving messages;

receiving at the system controller a message request including a message for transmission to a particular message subscriber unit;

determining in which cell the particular message subscriber unit is located based on customer paging area data for the particular message subscriber unit stored in the system controller;

transmitting the message for the particular message subscriber unit in a particular cell based on said step of determining;

transmitting a response signal from the particular message subscriber unit when the particular message subscriber unit receives the message; and updating the customer paging area data for each message subscriber unit by adding and deleting cells from the customer paging area for each message subscriber unit according to a mobility pattern of each message subscriber unit in the messaging system coverage area, the step of updating comprises steps of:

generating a usage index associated with each cell for each message subscriber unit, the usage index representing a number of message receiving events by a message subscriber unit in a cell;

increasing the usage index for each cell for each message subscriber unit in response to an occurrence of a message receiving event in a cell by each message subscriber unit;

comparing the usage index with a first predetermined threshold after the step of increasing; and marking a cell with an addition mark which is to be added to the preferred cell list when its usage index exceeds the first predetermined threshold which before the step of increasing was less that the first predetermined threshold.

2. The method of claim 1, and further comprising the step of storing in each message subscriber unit the customer paging area data associated with each message subscriber unit.

3. The method of claim 2, wherein said preferred cell list being arranged in descending order of priority, and further comprising the step of periodically transmitting in each cell a cell identifier signal which includes a cell identifier.

4. The method of claim 3, and further comprising the steps of:

transmitting a registration signal from the particular message subscriber unit when the particular message subscriber unit leaves its customer paging area as determined in response to receiving a cell identifier signal having a cell identifier corresponding to a cell which is not in the customer paging area when a previously received cell identifier signal had a cell identifier corresponding to a cell inside the customer paging area of the particular message subscriber unit, or when the particular message subscriber unit is outside its customer paging area and determines that it is in a new cell in response to receiving a cell identifier signal having a cell identifier different from a cell identifier in a previously received cell identifier signal; and receiving the registration signal in the cell outside the customer paging area of the particular message subscriber unit and relaying the registration signal to the system controller for registering and storing a location for the particular message subscriber unit.

5. The method of claim 4, wherein the step of determining further comprises determining a location of the particular message subscriber unit based on a cell in its customer paging area where the particular message subscriber unit most recently received a message, and wherein the step of updating further comprises assigning a priority to the cell where the particular message subscriber unit most recently received a message.

6. The method of claim 4, wherein the step of determining comprises accessing in the system controller the location of the particular message subscriber unit which was determined in response to receipt of a registration signal from the particular message subscriber unit which indicates the particular message subscriber unit has left its customer paging area.

7. The method of claim 6, wherein the step of determining further comprises steps of:

accessing the customer paging area data for the particular message subscriber unit which is stored in the system controller when registration information is not available in the system controller for the particular message subscriber unit;

transmitting a location confirming signal in at least one cell in the customer paging area of the particular message subscriber unit; and confirming that the particular message subscriber unit is located in a particular cell within its customer paging area when a response signal is received from the particular message subscriber unit in response to reception of the location confirming signal in said particular cell.

8. The method of claim 7, wherein the step of transmitting the location confirming signal comprises transmitting the location confirming signal independently in all of the cells in the preferred cell list.

9. The method of claim 7, wherein the step of transmitting the location confirming signal comprises sequentially transmitting the location confirming signal in cells in descending order of priority of the preferred cell list and waiting for a response signal from the particular message subscriber unit in each cell.

10. The method of claim 1, and further comprising steps of:

scaling down the usage index for each cell when a total number of message receiving events for the particular message subscriber unit exceeds a predetermined maximum;

comparing the usage index for the particular message subscriber unit for each cell with a second predetermined threshold after scaling down; and marking a cell for deletion from the preferred cell list with a deletion mark when a cell has a usage index less than the second predetermined threshold and which prior to scaling down had a usage index greater than the second predetermined threshold.

11. The method of claim 10, and further comprising a step of:

transmitting an update message for updating the customer paging area data of the particular message subscriber unit when a cell is to be added to the preferred cell list or a cell is to be deleted from the preferred cell list of the particular message subscriber unit;

receiving a response signal transmitted from the particular message subscriber unit in response to receiving the update message; and removing the addition mark or the deletion mark in response to receiving the response signal from the particular message subscriber unit and adding the cell associated an addition mark to the preferred cell list and deleting the cell associated with a deletion mark from the preferred cell list.

12. A two-way messaging system comprising:

a plurality of message subscriber units each comprising a receiver for receiving signals, a transmitter for transmitting response signals in response to receiving signals, and a memory for storing customer paging area data comprising cell identifiers corresponding to predetermined ones of cells in a messaging system coverage area where a message subscriber unit is most receiving messages;

a plurality of cells collectively defining a messaging system coverage area;

a plurality of base stations each associated with a cell and comprising a transmitter for transmitting signals to message subscriber units in a cell;

a plurality of receivers, at least one receiver being associated with a cell and coupled to a base station for receiving response signals from message subscriber units in a cell; and a system controller coupled to each base station and comprising a memory for storing the customer paging area data for each message subscriber unit, the system controller receiving a message request including a message for transmission to a particular message subscriber unit and coupling the message for transmission by a base station in a particular cell to the particular message subscriber unit based on the customer paging area data for the particular message subscriber unit stored in the system controller, the system controller automatically updating the customer paging area data for each message subscriber unit by tracking a mobility pattern of each message subscriber unit in the messaging system coverage area and by generating a usage index associated with each cell for each message subscriber unit, the usage index indicating a number of message receiving events by a message subscriber unit in a cell; increasing the usage index for each cell for each message subscriber unit in response to an occurrence of a message receiving event in a cell by each message subscriber unit; comparing the usage index with a first predetermined threshold after the step of increasing and marking a cell to be added to the customer paging area with an addition mark when its usage index exceeds the first predetermined threshold which before the step of increasing was less than the first predetermined threshold.

13. The system of claim 12, wherein the transmitter of each base station periodically transmits a cell identifier signal in an associated cell, the cell identifier signal including a cell identifier for the associated cell.

14. The system of claim 13, wherein the particular message subscriber unit receives the cell identifier signal and compares the cell identifier with its customer paging area data stored therein, and when the particular message subscriber unit leaves its customer paging area as determined in response to receiving a cell identifier signal having a cell identifier corresponding to a cell which is not in its customer paging area when a previously received cell identifier signal had a cell identifier corresponding to a cell inside the customer paging area of the particular message subscriber unit, or when the particular message subscriber unit is outside its customer paging area and determines that it is in a new cell in response to receiving a cell identifier signal having a cell identifier different from a cell identifier in a previously received cell identifier signal;

wherein a receiver in the cell where the particular message subscriber unit transmits the registration signal receives the registration signal and relays it to the system controller; and the system controller registers and stores a location for the particular message subscriber unit in response to the registration signal.

15. The system of claim 14, wherein the system controller determines a location of the particular message subscriber unit based on a cell in its customer paging area where the particular message subscriber unit most recently received a message, and the system controller assigns a priority to the cell where the particular message subscriber unit most recently received a message.

16. The system of claim 14, wherein the system controller determines a location of the particular message subscriber unit when a message is to be transmitted to the particular message subscriber unit by accessing the customer paging area data for the particular message subscriber unit when no registration information indicating that the particular message subscriber unit left its customer paging area is available for the particular message subscriber unit, the system controller controlling a base station associated with at least one cell in the customer paging area data for the particular message subscriber unit to transmit a location confirming signal and confirming a location of the particular message subscriber trait in a particular cell when a response signal is received from the particular message subscriber unit which is transmitted in response to reception of the location confirming signal in said particular cell.

17. The system of claim 16, wherein the system controller causes a location confirming signal to be transmitted independently in all cells in the customer paging area data of the particular message subscriber unit.

18. The system of claim 16, wherein the system controller causes a location confirming signal to be transmitted in cells in descending order of priority in the customer paging area for the particular message subscriber unit.

19. The system of claim 12, wherein the system controller:

scales down the usage index for each cell when a total number of message receiving events for the particular message subscriber unit exceeds a predetermined maximum;

compares the usage index for the particular message subscriber unit for each cell with a second predetermined threshold after scaling down; and marks a cell for deletion from the customer paging area with a deletion mark when its usage index is less than the second predetermined threshold and which prior to scaling down was greater than the second predetermined threshold.

20. The system of claim 19, and wherein the system controller generates an update message for transmission to the particular message subscriber unit, the update message for updating the customer paging area data of the particular message subscriber unit when a cell is to be added to the customer paging area or deleted from the customer paging area of the particular message subscriber unit;

the particular message subscriber unit transmits a response signal in response to receiving the update message; and the system controller removes the addition mark or deletion mark in response to receiving the response signal from the particular message subscriber unit and adds a cell associated with the addition mark to the customer paging area or deletes a cell associated with a deletion mark from the customer paging area.

* * * * *